United States Patent
Wang

(10) Patent No.: US 9,807,594 B2
(45) Date of Patent: Oct. 31, 2017

(54) COMMUNICATION SYSTEM, SERVER AND APPARATUS THEREOF

(71) Applicant: HOFATEK ENTERPRISE LTD., Taipei (TW)

(72) Inventor: Yu-Lin Wang, Taipei (TW)

(73) Assignee: HOFATEK ENTERPRISE LTD., Taipei (TW)

( * ) Notice: Subject to any disclaimer, the term of this patent is extended or adjusted under 35 U.S.C. 154(b) by 117 days.

(21) Appl. No.: 14/821,740

(22) Filed: Aug. 9, 2015

(65) Prior Publication Data

US 2016/0050711 A1 Feb. 18, 2016

(30) Foreign Application Priority Data

Aug. 13, 2014 (TW) .............................. 103127798 A

(51) Int. Cl.
| | | |
|---|---|---|
| H04J 1/16 | (2006.01) | |
| H04W 8/18 | (2009.01) | |
| H04L 29/06 | (2006.01) | |
| H04W 12/08 | (2009.01) | |

(52) U.S. Cl.
CPC ............ H04W 8/18 (2013.01); H04L 63/102 (2013.01); H04W 12/08 (2013.01)

(58) Field of Classification Search
CPC . H04L 47/10; H04L 2012/5631; H04L 47/15; H04L 47/2441; H04L 47/70; H04L 12/66; H04L 2012/46; H04L 2012/5618; H04L 12/46; H04L 12/4625; H04L 12/462; H04L 12/40097
USPC ......................................... 370/230, 401, 402
See application file for complete search history.

(56) References Cited

U.S. PATENT DOCUMENTS

| | | | |
|---|---|---|---|
| 8,984,657 B2 * | 3/2015 | Nerger ...................... | G06F 8/65 726/29 |
| 2013/0014136 A1 * | 1/2013 | Bhatia .................. | H04N 21/252 725/9 |

* cited by examiner

*Primary Examiner* — Brenda H Pham
(74) *Attorney, Agent, or Firm* — Anna Tsang

(57) ABSTRACT

A communication system includes a plurality of communication devices, and a server. The communication devices share a phone number and respectively have an identification data. The server stores a state data corresponding to the phone number. The state data includes an allowable communication state corresponding to each of the identification data. The server allows one of the communication devices to communicate through the server according to the allowable communication state and disallows the other communication devices to communicate through the server. The allowed communication device transmits a command to the server to change the allowable communication state of the state data according to an operation of a user, that one of the disallowed communication devices is allowed to communicate through server instead, and the originally allowed communication device is disallowed to communicate instead.

3 Claims, 5 Drawing Sheets

COMMUNICATION SYSTEM, SERVER AND APPARATUS THEREOF

CROSS REFERENCE TO RELATED APPLICATIONS

This Non-provisional application claims priority under 35 U.S.C. §119(a) on Patent Application No(s). 103127798 filed in Taiwan, Republic of China on Aug. 13, 2014, the entire contents of which are hereby incorporated by reference

BACKGROUND

1. Field

The present invention relates to a communication system, server and apparatus thereof, and especially relates to a communication system, server and apparatus for changing allowable and/or disallowable communication states.

2. Description of the Related Art

To date, the mobile communication devices have been vigorously developed from a phone with basic calling features to a phone with camera and even to a smart phone with mobile internet function. Their features are more and more various than ever. Regardless instantly sharing photos or motion, browsing friend information, searching information, playing online games or watching online videos stream, users can utilize the mobile internet function to operate the above functions, and it is greatly convenient for people.

Due to various types and styles of the mobile communication devices, users can purchase the appropriate device according to functions and preferences, such as smart phones for easily carrying or tablet computer with large size screen. However, when users have multiple mobile communication devices and each of the communication devices are required to operate with mobile internet, the communication devices should operate with a plurality of phone numbers or a single SIM card needs to be swap in each communication device to operate with mobile internet. Thus, it cost a lot of phone number fees and is quite inconvenient.

SUMMARY

For the foregoing prior art problems, the object of the present invention is to provide a communication system including a plurality of communication devices and a server. The communication devices share a phone number and respectively having an identification data. The server stores a state data corresponding to the phone number. The state data has an allowable communication state corresponding to each of the identification data. The server allows one of the communication devices to communicate through the server according to the allowable communication state and disallows the other communication devices to communicate through the server. The allowed communication device transmits a command to the server to change the allowable communication state of the state data according to an operation of a user, such that one of the disallowed communication devices is allowed to communicate through the server instead, and the originally allowed communication device is disallowed to communicate instead.

In accordance with the object of the present invention, a communication method is provided. A communication method according to the present invention is adapted for a plurality of communication devices and a server. The communication devices share a phone number and respectively have an identification data. The server stores a state data corresponding to the phone number. The state data has an allowable communication state corresponding to each of the identification data, the communication method includes the steps as follows: according to the allowable communication state by the server, allowing one of the communication devices to communicate through the server, and disallowing the other communication devices to communicate through the server; by the allowed communication device, transmitting a command to the server to change the allowable communication state of the state data, such that one of the disallowed communication devices is allowed to communicate through the server instead, and the originally allowed communication device is disallowed to communicate instead.

In accordance with the object of the present invention, a server apparatus is provided. A server apparatus for a communication system comprising a plurality of communication devices sharing a phone number and respectively having an identification data, and the server storing a state data corresponding to the phone number, the state data has an allowable communication state corresponding to each of the identification data, the server apparatus comprising: a state data stored corresponding to the phone number, wherein the state data has an allowable communication state corresponding to each of the identification data, the server allows one of the communication devices to communicate through the server according to the allowable communication state and disallows the other communication devices to communicate through the server; wherein the allowed communication device transmits a command to the server to change the allowable communication state of the state data according to an operation of a user, such that one of the disallowed communication devices is allowed to communicate through the server instead, and the originally allowed communication device is disallowed to communicate instead.

In one embodiment, the user executes the operation by an application program.

In accordance with the object of the present invention, a communication apparatus is provided. A communication apparatus for a communication system comprising a server apparatus storing a state data, the communication apparatus comprising: a plurality of communication devices, sharing a phone number and respectively having an identification data; wherein the server apparatus stores the state data corresponding to the phone number, the state data has an allowable communication state corresponding to each of the identification data, and one of the communication devices is allowed to communicate through the server apparatus according to the allowable communication state and the other communication devices is disallowed to communicate through the server; wherein the allowed communication device transmits a command to the server to change the allowable communication state of the state data according to an operation of a user, such that one of the disallowed communication devices is allowed to communicate through the server instead, and the originally allowed communication device is disallowed to communicate instead.

In one embodiment, the identification data are stored in the communication devices, a subscriber identity module (SIM) card, or a removable user identity module (R-UIM or UIM) card.

In summary, as to the communication system, the communication method and the application program of the present invention, because a plurality of communication devices share a phone number and the allowable communication state of the communication devices is switchable, it is not necessary for the communication devices to utilize a plurality of phone numbers or swap the subscriber identity module (SIM) card to communicate. Thus, it reduces the cost of a plurality of phone numbers and avoids the inconvenience of repeatedly swapping the SIM card.

BRIEF DESCRIPTION OF THE DRAWINGS

Features will become apparent to those of skill in the art by describing in detail exemplary embodiments with reference to the attached drawings in which.

DETAILED DESCRIPTION

A communication system, a server apparatus and a communication apparatus according to a preferred embodiment of the present invention will be apparent from the following detailed description, which proceeds with reference to the accompanying drawings, wherein the same references relate to the same elements.

Figure 1:
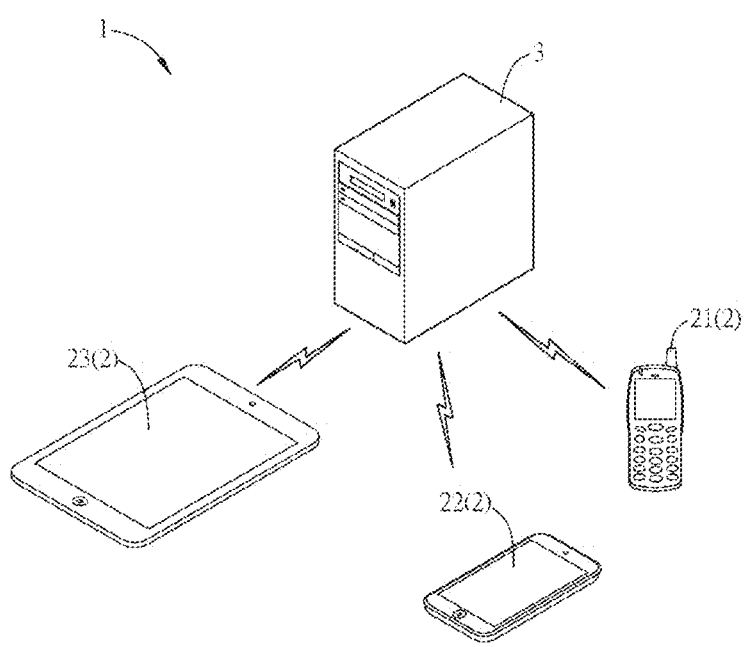
FIG. 1 is a schematic diagram of a communication system according to the preferred embodiment of the present invention.

FIG. 1 is a schematic diagram of a communication system according to the preferred embodiment of the present invention. Referring to FIG. 1, a communication system 1 includes a communication apparatus 2 and a server apparatus 3. The communication apparatus 2 includes a plurality of communication devices. The number of the communication devices can be more than two, and it takes three communication devices for example in the embodiment.

In the embodiment, the communication devices 2 include a first communication device 21, a second communication device 22 and a third communication device 23. The communication devices 2 can be, for example but not limited to, a conventional mobile phone, a smart phone, a tablet phone, a tablet computer, a notebook computer (e.g. ultrabook computer), a desktop computer, a personal digital assistant, or other electronic devices. In the embodiment, the first communication device 21 is a conventional phone, the second communication device 22 is a smart phone, and the third communication device 23 is a tablet computer.

The communication devices 2 respectively have an identification data ID and share a phone number. Each identification data ID can be stored in each of the communication devices 2, such as International Mobile Equipment Identity number (IMEI), an identification additionally supplied by the telecommunication corporation, a subscriber identity module (SIM) card, a removable user identity module (R-UIM or UIM) card, smart card or IC card, etc. In the embodiment, the first communication device 21 has a first identification data ID1, the second communication device 22 has a second identification data ID2, and the third communication device 23 has a third identification data ID3.

The server apparatus 3 stores a state data corresponding to the phone number, wherein the state data includes an allowable communication state corresponding to each identification data ID. For example, the first communication device 21 is set "allowed to communicate" and the second communication device 22 and the third communication device 23 are set "disallowed to communicate". Further, when the communication devices 2 (e.g. the first communication device 21) try to communicate through the server apparatus 3, the server apparatus 3 will firstly confirm the identification data ID of the communication devices 2 (e.g. the first identification data ID1) and check the allowable communication state of the identification data ID. When the allowable communication state corresponding to the identification data is set "allowed to communicate", the communication apparatus 2 corresponding to the identification data ID can communicate through the server apparatus 3, for example, sending and receiving phone calls or short messages, or utilizing the mobile internet. When the allowable communication state corresponding to the identification data ID is set "disallowed to communicate", the corresponding communication apparatus 2 cannot communicate. In the embodiment, in the same time interval, only one communication apparatus 2 is "allowed to communicate". Thus, for example, when the first communication device 21 is "allowed to communicate", the second communication device 22 and the third communication device 23 are "disallowed to communicate". The allowable communication state can be set by telecommunication corporations or users.

In addition, the server apparatus 3 can be a server of a telecommunication corporation or a master computer of service center which has service of fixed network communications, a mobile network or a fixed-satellite communications.

The communication apparatus 2 allowed to communicate, in accordance with an operation of a user, transmits a command to the server apparatus 3 to change the allowable communication state of the state data, such that one of the disallowed communication devices 2 is allowed to communicate through the server apparatus 3 instead, and the originally allowed communication apparatus 2 is disallowed to communicate instead. Simply, the user can change the allowable communication state of the server apparatus 3 via the allowed communication apparatus 2, and then another communication apparatus 2 is switched to communicate.

In the embodiment, the user utilizes an application program to execute above operations and then transmit commands to the server apparatus 3. The application program can be installed in the storage device of above communication apparatus 2, for example a memory, or installed in other electronic device, for example installed in a personal computer. The user can transmit a command by operating the application program in the allowed communication apparatus 2 or other electronic device, and then change the allowable communication state of the server apparatus 3.

The following descriptions are cited to illustrate the practical application of the present invention. However, a person having ordinary skill in the application should understand that the following examples are not intended to limit the practical aspect of the invention and any embodiment that can achieve the above effect should be covered by the above-described embodiments.

Please referring to FIG. 1, in the initial settings, the allowable communication state will set the first communication device 21 which has the first identification data ID1 "allowed to communicate", such that the user only can utilize the first communication device 21 to communicate through above phone number. When the user want to execute the mobile internet of the second communication device 22, the user can operate the application program of the first communication device 21 to transmit a command to the server apparatus 3 and then change the allowable communication state. For example, the first communication device 21 in the embodiment is a conventional phone, and the user cannot play the online game, watch the online video stream, or utilize other functions requiring mobile internet by the conventional phone. Thus, the user should utilize the mobile internet of the smart phone of the second communication device 22 in the embodiment to play online game or watch online movie. So the user operates the application program to transmit a command to the server apparatus 3. At the moment, the state data stored in the server apparatus 3 changes the state for the second communication device 22 (smart phone) to "allowed to communicate" according to the command transmitted by the first communication device 21, and the allowable communication state of the first communication device 21 (conventional phone) is changed to "disallowed to communicate". Then, the user can play the online game and watch online video stream by the smart phone (second communication device 22). In other words, the server apparatus 3 receives the command and then switches to enable or disable the communication apparatus 2.

Similarly, in the embodiment, the user originally utilizes the tablet computer of the third communication device 23 to communicate. Regarding the fact that the tablet computer is not easy to carry, and the user wants to switch to use the conventional phone of the first communication device 21, the user just needs to utilize the application program to transmit a command to the server apparatus 3 for changing the allowable communication state, such that the first communication device 21 can communicate through the server apparatus 3 and the third communication device 23 cannot communicate through the server apparatus 3. In addition, the switching between the above communication apparatus 2 is just for example, and the allowable communication state can be switched on demands.

Figure 2:
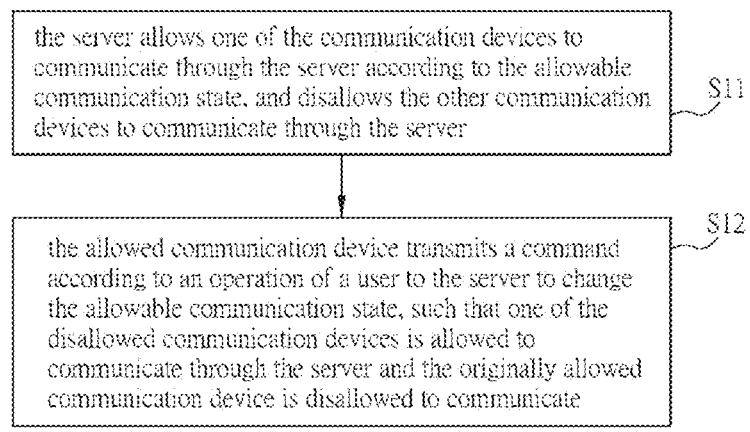
FIG. 2 is a flow chart of steps of a communication method according to the preferred embodiment of the present invention.

FIG. 2 is a flow chart of a communication method according to the preferred embodiment of the present invention. Referring to FIGS. 1-2, the communication method is adapted for the above communication system 1. Because the configuration and the operation of the communication system 1 are described as above, they will not be repeated again. Herein, the communication method includes the steps as follows. The server allows one of the communication devices to communicate through the server according to the allowable communication state, and disallows other communication devices to communicate through the server (S11). The allowed communication device transmits a command to the server according to an operation of a user to change the allowable communication state of the state data, such that one of the disallowed communication devices is allowed to communicate through the server instead, and the originally allowed communication device is disallowed to communicate (S12).

In step S11, the user can communicate through the allowed communication apparatus 2, for example the first communication device 21.

In step S12, for example but not limited to, the command can be transmitted to the server apparatus 3 through the application program of the allowed communication apparatus 2 to change the allowable communication state, and then switch the communication device to communicate or not.

Figure 3:
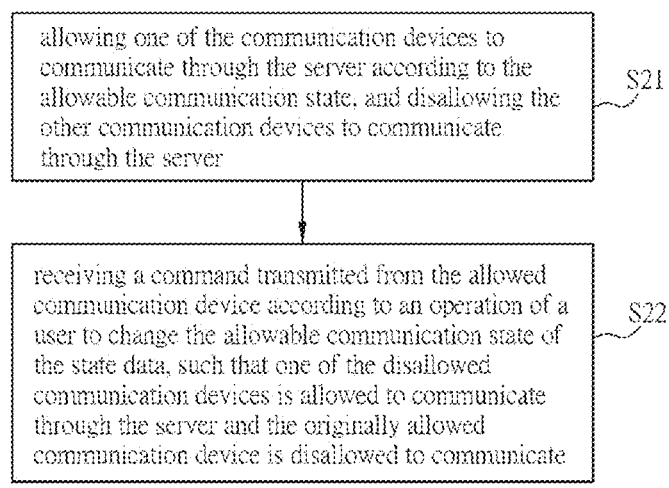
FIG. 3 is a flow chart of steps executed by a server apparatus.

FIG. 3 is a flow chart of steps executed by a server. The server apparatus 3 can have a storage device, such as random access memory (RAM), flash memory, read only memory (ROM), programmable read-only memory (PROM), erasable programmable read only memory (EPROM), registers, hard disks, removable disks, compact disc read-only memory (CD-ROM), or any known type of the physical storage media in the technology field. Similarly, when the application program stored in the storage device of the server apparatus 3 is executed, the server apparatus 3 can execute the following steps: allowing one of the communication devices to communicate through the server according to allowable communication state and disallowing the other communication devices to communicate through the server (S21); and receiving a command transmitted from the allowed communication device according to an operation of a user to change the allowable communication state, such that one of the disallowed communication devices is allowed to communicate through the server and the originally allowed communication device is disallowed to communication (S22). Because the description of server apparatus 3 can refer to the above embodiment, it is not repeated again.

Figure 4A:
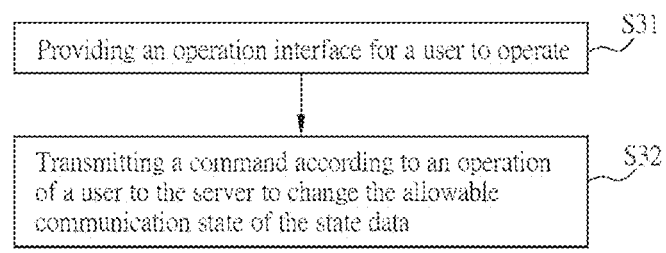
FIG. 4A is a flow chart of executing steps executed by a communication apparatus.

FIG. 4A is a flow chart of executing steps executed by the communication apparatus 2. Referring to FIG. 4A, in the embodiment, an application program is installed in the above communication apparatus 2. As described above, the application program can be installed in other electronic devices. When the user want to transmit the above switching request, the user can at first start the application program in the embodiment. The application program can be, for example but not limited to, downloaded from the telecommunications, the manufacturer of mobile phone or other vendors.

When the application program is started, a user interface is provided for the communication apparatus 2 for a user to operate (S31). The operation interface, for example, is the selecting interface as shown in FIG. 4B.

Figure 4B:
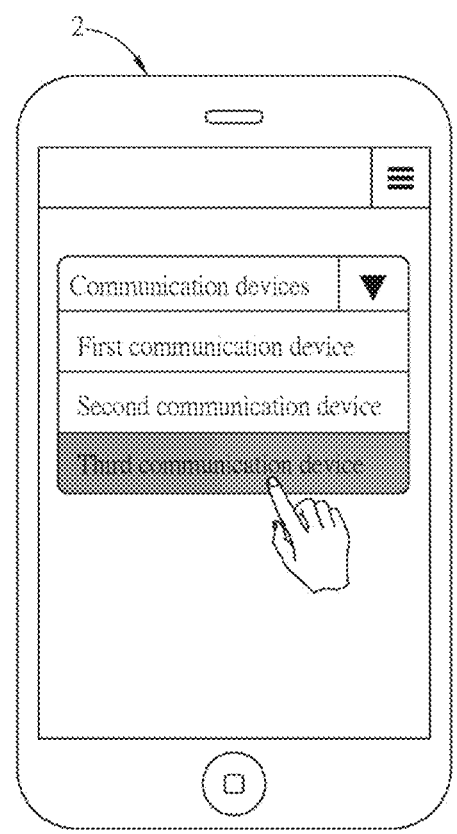
FIG. 4B is a schematic diagram of a user interface for the communication apparatus according to the preferred embodiment of the present invention.

Referring to FIGS. 1, 4A and 4B together, the selecting interface provided in the embodiment is a drop-down menu and it can be a button or other graphical interface in other embodiments, and it is not limited thereto in the present invention. When the user want to switch the communication apparatus 2 to communicate (for example switch from the second communication device 22 to the third communication device 23), he may choose the corresponding communication apparatus 2 (for example the third communication device 23) from the selecting interface. For example, the user can touch the touch panel of the communication apparatus 2 to select the corresponding communication apparatus 2. At the moment, the application program in the embodiment can transmit the above command to change the allowable communication state of the state data through the device that the application program is installed, for example, the allowed communication apparatus 2 or other electronic device, namely as described in step S32. Therefore, the server apparatus 3 can execute the following steps: allowing one of the disallowed communication devices 2 (the third communication device 23 in the embodiment) to communicate through the server apparatus 3, and disallowing the originally allowed communication apparatus 2 (the second communication device 22 in the embodiment) is disallowed to communicate.

In summary, as to the communication system, the communication method, the server and the application program of the present invention, because a plurality of communication devices share a phone number and the allowable communication state of the communication devices is switchable, it is not necessary for the communication devices to utilize a plurality of phone numbers or swap the subscriber identity module (SIM) card to communicate. Thus, it reduces the cost of a plurality of phone numbers and avoids the inconvenience of repeatedly swapping the SIM card.

Although the invention has been described with reference to specific embodiments, this description is not meant to be construed in a limiting sense. Accordingly, it will be understood by those of skill in the art that various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A communication system comprising:
   a plurality of communication devices, sharing a phone number, each of the communication devices having an identification data respectively; and;
   a server apparatus for
      storing a state data corresponding to the phone number, wherein the state data has an allowable communication state or a disallowable communication state corresponding to each of the identification data, the server allows one of the communication devices to communicate and disallows the other communication devices to communicate according to the state data;
   wherein the allowed communication device transmits a command to the server to change the state data according to an operation of a user, such that one of the disallowed communication devices is allowed to communicate through the server, and the originally allowed communication device is disallowed to communicate by the command sent by the allowed communication device itself.

2. The communication system of claim 1, wherein the identification data are stored in the communication devices, a subscriber identity module (SIM) card, or a removable user identity module (R-UIM or UIM) card.

3. The communication system of claim 1, wherein the user executes the operation by an application program.

\* \* \* \* \*